United States Patent
Buchenberger et al.

(10) Patent No.: US 9,815,391 B2
(45) Date of Patent: Nov. 14, 2017

(54) VEHICLE SEAT WITH SIDE PIECES MADE OF AUTOREACTIVE FRAMEWORK STRUCTURES

(71) Applicant: SITECH SITZTECHNIK GMBH, Wolfsburg (DE)

(72) Inventors: Martin Buchenberger, Wendeburg (DE); Jens Baumgarten, Braunschweig (DE)

(73) Assignee: SITECH SITZTECHNIK GMBH, Wolfsburg (DE)

( * ) Notice: Subject to any disclaimer, the term of this patent is extended or adjusted under 35 U.S.C. 154(b) by 296 days.

(21) Appl. No.: 14/230,769

(22) Filed: Mar. 31, 2014

(65) Prior Publication Data

US 2014/0210247 A1 Jul. 31, 2014

Related U.S. Application Data

(63) Continuation of application No. PCT/EP2012/002471, filed on Jun. 11, 2012.

(30) Foreign Application Priority Data

Sep. 30, 2011 (DE) ........................ 10 2011 114 622

(51) Int. Cl.
| | | |
|---|---|---|
| *B60N 2/44* | (2006.01) | |
| *B60N 2/64* | (2006.01) | |
| *B60N 2/68* | (2006.01) | |

(52) U.S. Cl.
CPC ........... *B60N 2/4492* (2015.04); *B60N 2/449* (2013.01); *B60N 2/64* (2013.01); *B60N 2/646* (2013.01); *B60N 2/68* (2013.01)

(58) Field of Classification Search
CPC ...... B60N 2/42; B60N 2/4415; B60N 2/4492; B60N 2/449; B60N 2/64; B60N 2/643;
(Continued)

(56) References Cited

U.S. PATENT DOCUMENTS 8,231,174 B2 * 7/2012 Yamada ................... B60N 2/20
                                                          297/284.11
2006/0181126 A1 * 8/2006 Eysing ................... A47C 7/405
                                                          297/284.1
(Continued)

FOREIGN PATENT DOCUMENTS

DE 10 2005 054 125 B3 5/2007
DE 10 2007 054 257 A1 5/2009
(Continued)

OTHER PUBLICATIONS

Machine Translation of DE 10 2007 054 257 A1, http://translationportal.epo.org/emtp/translate?ACTION=description-retrieval&COUNTRY=DE&ENGINE=google&FORMAT=docdb&KIND=A1&LOCALE=en_EP&NUMBER=102007054257&OPS=ops.epo.org%2F3.1&SRCLANG=de&TRGLANG=en&apikey=TSMqTfrVAvNtryGI8QIfbozj8DnAGIqJ&PDF=true&PDFboth=true, Jan. 7, 2016.*

*Primary Examiner* — Ryan D Kwiecinski
(74) *Attorney, Agent, or Firm* — Muncy, Geissler, Olds & Lowe, P.C.

(57) ABSTRACT

A vehicle seat with a backrest-side and/or a seat part-side base structure which comprises at least one movable sidepiece structure. At least the sidepiece structure of the base structure is made of at least one framework structure. The at least one sidepiece framework structure has flexurally elastic flanks and deflectable transverse braces which lie between the flanks and which are arranged on the flanks via elastic connecting element, whereby a force pulse that acts on the transverse braces of the at least one sidepiece framework structure from one direction via a flexurally elastic flank causes a compensating autoreactive deformation of the at least one sidepiece framework structure in the opposite direction at another point.

13 Claims, 7 Drawing Sheets

(58) Field of Classification Search
CPC ........... B60N 2/646; A47C 7/022; A47C 7/14; A47C 7/46
USPC .............. 297/216.13, 230.11, 230.13, 284.9, 297/452.13, 452.34, 452.56
See application file for complete search history.

(56) References Cited

U.S. PATENT DOCUMENTS

| | | | | |
|---|---|---|---|---|
| 2009/0284059 | A1* | 11/2009 | Gupta | B60N 2/0224 297/284.9 |
| 2013/0278028 | A1* | 10/2013 | Gaeng | B60N 2/4882 297/216.12 |
| 2014/0077565 | A1* | 3/2014 | Baumgarten | B60N 2/4805 297/404 |
| 2015/0197173 | A1* | 7/2015 | Hulway | B60N 2/643 297/284.9 |

FOREIGN PATENT DOCUMENTS

| | | |
|---|---|---|
| DE | 10 2009 033 883 A1 | 1/2011 |
| EP | 1 040 999 A2 | 10/2000 |
| EP | 1 577 158 A1 | 9/2005 |

* cited by examiner

VEHICLE SEAT WITH SIDE PIECES MADE OF AUTOREACTIVE FRAMEWORK STRUCTURES

This nonprovisional application is a continuation of International Application No. PCT/EP2012/002471, which was filed on Jun. 11, 2012, and which claims priority to German Patent Application No. 10 2011 114 622.2, which was filed in Germany on Sep. 30, 2011, and which are both herein incorporated by reference.

BACKGROUND OF THE INVENTION

Field of the Invention

The present invention relates to a vehicle seat, which has a base structure with adjustable side pieces.

Description of the Background Art

"Function-integrated, bionic car seats" are known from the prior art. The particular feature of these seats lies in the design of the backrest, which utilizes the fin ray principle. The use of this principle and the basic structure, the so-called fin ray structure, have already been described in EP 1 040 999 A2 for the construction of structural elements, such as backrests and seat areas.

The fin ray principle can be observed in fish. It is based on the special structure of the fin rays of fish. When a point is pressed, the principle causes the fin ray to move opposite to this pressure direction. The fin ray reacts to the pressure with counterpressure. This becomes possible because of the special structure of the fin ray with two flexible braces, which converge at a tip and there grow together solidly. Transverse braces, which keep the flanks at a distance and allow elastic movements, are located between the two elastic flanks. If the tail ray is held firmly at the base, which is opposite to the tip, and the middle of the fin blade is pressed with a finger, the fin tip contrary to expectations moves opposite to the pressing direction of the finger.

This operating principle was already realized technically in a backrest structure of a car seat in the following manner: Two flexible flanks made of thermoplastic fiberglass composite (a so-called organic sheet) form the front and back of the backrest. These are attached at the bottom to the backrest base, run together tapering upwards, where their ends are connected. Braces attached in an articulated manner to the flanks connect the front and back sides and keep these at a distance. Such a backrest also provides support in the lumbar area, yields in the shoulder region mostly toward the back, and thereby simultaneously reduces the distance of a head cushion of a head restraint to the head of a seat occupant. In large displacements, as may also occur, for example, in a rear-end collision, thus whiplash injury can be effectively countered with the aid of such a backrest structure. Thus, an anti-whiplash effect in the head area can be achieved with such a backrest structure.

A vehicle seat that utilizes the fin ray principle is described in the publication DE 10 2005 054 125 B3. The backrest frame of the vehicle seat comprises a construction built on the fin ray principle in a frame-like fashion. The construction comprises a rigid rear wall, a flexibly formed plate-like front wall, and transverse braces arranged between them. The transverse braces extend in their longitudinal direction along the vehicle seat width direction. The front wall and rear wall, in contrast, have a longitudinal extension in the vehicle height direction. The publication provides a backrest of a vehicle seat, which can be deformed in a simple way by using the fin ray principle both in the lumbar and in the shoulder region with mutual interdependence.

A vehicle seat with a backrest is known from the publication DE 10 2009 033 883 A, which has a supporting rod structure at least in a lateral middle area for at least one cushion part supporting the seat user. The rod structure is fastened at the bottom to a supporting part, which is supported on the seat part of the vehicle seat. The rod structure between a front and rear support wall has in each case supporting rods arranged at a vertical distance from one another. The rod structure forms a free space open at least at the bottom or on the side. An upwardly or laterally protruding support element, which is not or at most slightly deformable and projects from the bottom or laterally into the free space of the rod structure, is attached to the supporting part. With greater stress on the backrest toward the back or toward the front, the supporting element either immediately or after a predetermined elastic deformation of the rod structure in the lower area comes to rest against the facing front or rear support wall and/or at least one supporting rod and supports the affected front support wall and/or supporting rod which is in contact. Publication DE 10 2009 033 883 A1 in its introduction refers to DE 10 2005 054 125 B3, which describes a backrest frame, which is made frame-like with consideration of the fin ray principle. The bar structure of the backrest which is described in the publication DE 10 2009 033 883 A1 also utilizes the fin ray principle, whereby side cushion parts supporting a seat user are arranged to the side of the bar structure but these cannot be adjusted further relative to the bar structure.

SUMMARY OF THE INVENTION

It is therefore an object of the present invention to provide a seat with a backrest-side and/or a seat-part-side base structure, which comprises at least one movable side piece structure. The seat can be, for example, a vehicle seat, an airline seat, roller coaster seat, etc.

In an embodiment, the fin ray principle is used for the adjustment of side pieces of a seat part and/or a backrest of a vehicle seat.

It is provided according to an embodiment of the invention to form a side piece of a seat part and/or a backrest of a vehicle seat as a fin ray design or fin ray structure or stated differently, to form at least the side piece as an intelligent reactive structure, which functions or reacts with use of bionic approaches, as will be described in greater detail below.

According to an embodiment of the invention, an autoreactive structure in the manner of the fin ray design is proposed for the side piece structure, whereby the autoreactive side piece structure has a function that works according to the described fin ray principle.

It is provided according to an embodiment of the invention in detail that at least the side piece structure of the base structure is made of at least one framework structure. The at least one side piece framework structure has flexurally elastic flanks and deflectable transverse braces which lie between the flanks and are arranged on the flanks via elastic connecting elements, as a result of which a force pulse acting on the transverse braces of the at least one side piece framework structure from one direction via a flexurally elastic flank causes a compensating autoreactive deformation of the at least one side piece framework structure in the opposite direction at another point.

It is provided in an embodiment of the invention that the base structure further has a connecting structure on which one or more side piece framework structures are arranged.

In an embodiment of the invention, the connecting structure can be a connecting framework structure with flexurally elastic flanks and deflectable transverse braces which lie between the flanks and are arranged on the flanks via elastic connecting element. In this first embodiment, therefore the entire base structure, both the side piece structures and the connecting structure, are made according to the fin ray principle. The middle area of a seat part and/or a backrest in which the connecting framework structure is arranged is thus made just like the side piece framework structure as a framework structure according to the fin ray principle.

In another embodiment of the invention, the connecting structure can be an elastic base body, which is made as an elastic hollow body or as an elastic solid body. The connecting bodies are made, for example, from a seat foam. The side piece structures are made furthermore as framework structures according to the fin ray principle. This second design form therefore concerns a base structure, in which the fin ray framework structure is used exclusively for the side piece structure, whereby in the middle area of a seat part or a backrest a reversible elastic connecting structure, for example, the connecting body, is arranged, which does not work according to the fin ray principle.

In a further embodiment, which can be provided in both design forms, the side piece framework structures and the connecting structure in the first or second design form have an elastic layer spanning the structures.

The connecting structures in the first or the second design form and/or the side piece framework structures can have at least one thickened area, which allows an improved ergonomic adjustment of the side piece framework structures and/or the connecting structures to a person's buttocks area or back area.

In so far as the spanning elastic layer is realized, it is proposed to integrate at least one thickened area in the elastic layer.

It is provided further that at least one framework structure, which can be formed in the side piece structure or optionally (first design form) also in the connecting structure as a connecting framework structure, has a triangular or a rectangular shape, whereby a plurality of framework structures of the same shape or different shapes can be assembled to form a multi-framework structure.

The invention proposes the use of a framework structure constructed and functioning according to the fin ray principle at least for side piece structures of a vehicle seat and optionally for a connecting structure, which connects a plurality of side piece structures, whereby the at least one framework structure has flexurally elastic flanks and deflectable transverse braces, which lie between the flanks and are arranged on the flanks via elastic connecting element, as a result of which a force pulse acting on the transverse braces of the at least one framework structure from one direction via a flexurally elastic flank causes a compensating autoreactive deformation of the at least one framework structure in the opposite direction at another point.

The force pulse is a resulting force that is exerted by a person seating himself on the vehicle seat at a point on the at least one side piece framework structure, as a result of which the at least one side piece framework structure at another point automatically moves in the direction opposite to the direction of the force pulse toward the person seating himself in such a way that the person's lateral support in the vehicle seat is improved.

In an embodiment of the invention, in a starting position of the base structure a top side of one or more side piece framework structures together with the top side of the connecting structure (the first or second design form) forms a substantially planar surface.

In another embodiment of the invention, in a starting position of the base structure a top side of one or more several side piece framework structures are arranged slightly inclined relative to the connecting structure (the first or second design form), so that the base structure in the starting position already has overall a substantially slightly inclined pan contour.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 1B1-1B3 show schematic illustrations of different variants of triangular autoreactive framework structures;

FIGS. 1C1-1C11 show illustrations of the deformation behavior of the autoreactive framework structures shown schematically in FIGS. 1B1-1B3;

FIGS. 2B1-2B4 show schematic illustrations of different variants of rectangular autoreactive framework structures;

FIGS. 2C1-2C11 show illustrations of the deformation behavior of the autoreactive framework structures shown schematically in FIGS. 2B1-2B4;

FIGS. 3B1-3B5 show schematic illustrations of different variants with specifically formed and combined autoreactive framework structures;

FIGS. 3C1-3C17 show illustrations of the deformation behavior of the autoreactive framework structures shown schematically in FIGS. 3B1-3B5;

DETAILED DESCRIPTION

The invention will be described below. For the purposes of the present description, the conventional direction of travel of a vehicle is designated with "+x" ("plus x"), and the direction opposite to its conventional direction of travel with "−x" ("minus x"); the direction in the horizontal line transverse to the x-direction is designated with "y" and the direction in the vertical line transverse to the x-direction with "z." This terminology for the spatial directions in Cartesian coordinates corresponds to the coordinate system generally used in the automotive industry.

If an "autoreactive" structure is discussed below, then this means a "reactive" framework structure, which with the use of bionic approaches obeys the previously described fin ray principle and "auto"matically alters its form due to an acting force pulse.

Various embodiments of autoreactive framework structures for use in a seat part 100 and/or a backrest are described below:

First Exemplary Embodiment

Figure 1A:
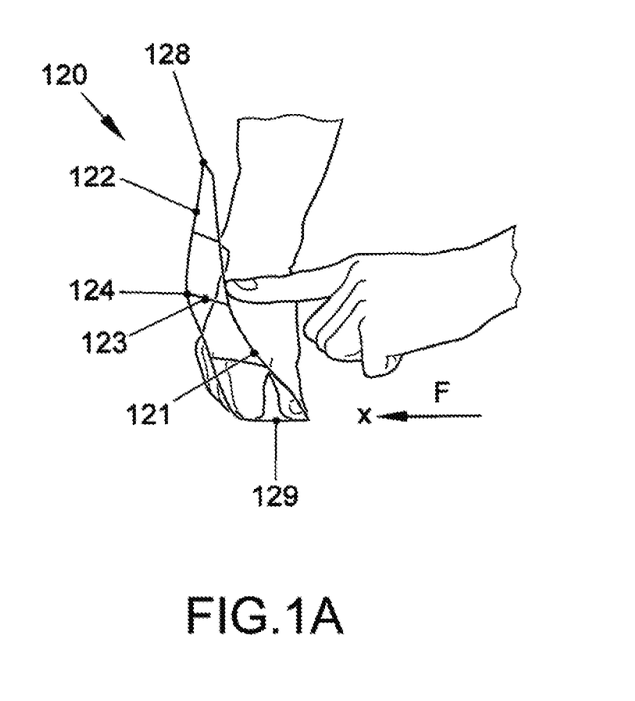
FIG. 1A shows a schematic illustration of a deformation of a triangular autoreactive framework structure under the action of a force.
Figure 1B:
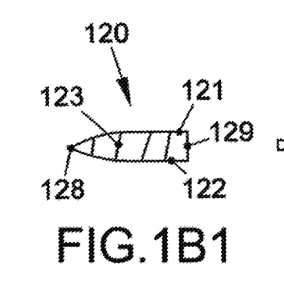
Figure 1B:
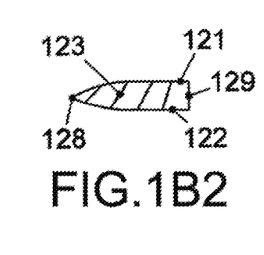
Figure 1B:
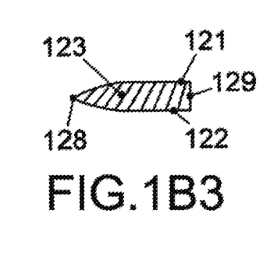
Figure 1C:
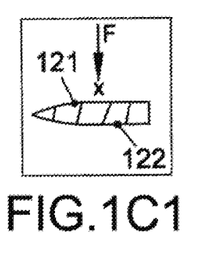
Figure 1C:
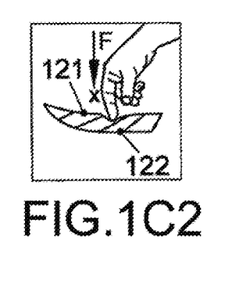
Figure 1C:
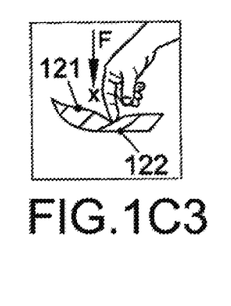
Figure 1C:
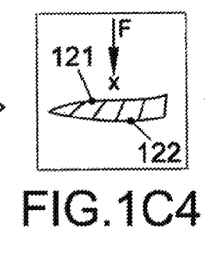
Figure 1C:
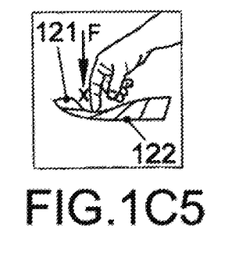
Figure 1C:
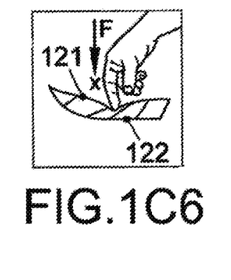
Figure 1C:
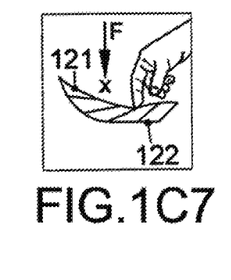
Figure 1C:
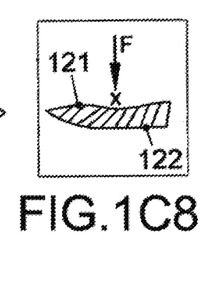
Figure 1C:
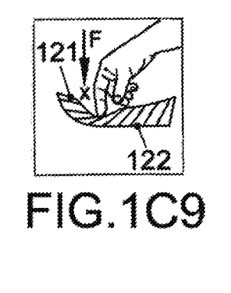
Figure 1C:
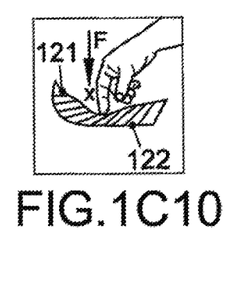

FIG. 1A shows a schematic illustration of a deformation of a triangular autoreactive side piece framework structure 120 under the action of a force F, which is designated below only as framework structure 120. In the first embodiment, autoreactive framework structure 120, seen in section, is made triangular. Framework structure 120 has a first flexurally elastic flank 121 and a second flexurally elastic flank 122. Transverse braces 123 are arranged elastically movable via elastic connecting element 124 between flexurally elastic flanks 121, 122. Flexurally elastic flanks 121, 122 and transverse braces 123 may be made as planar, plate-like structures. In the triangular embodiment, framework structure 120 at one end forms a tip 128 and at the other end a bar 129 forming a base, which is formed by a transverse brace 123, which is arranged between the ends, diverging on one side, of flexurally elastic flanks 121, 122.

FIGS. 1B1-1B3 show schematic sectional illustrations of different variants of the first embodiment, whereby the variants differ in the arrangement of transverse braces 123 between flexurally elastic flanks 121, 122. Depending on the number and orientation of transverse braces 123 between flexurally elastic flanks 121, 122, under the action of a force F, which acts in a point-like or planar manner on the first flexurally elastic flank 121 and exerts a force pulse on framework structure 120, a deformation, different in each case, of framework structure 120 is produced. The direction of the deformation is opposite to the direction of the force pulse.

The deformation of triangular autoreactive framework structure 120 can be seen in FIGS. 1A and 1C2-1C3. In FIG. 1A, deformed framework structure 120 is shown in section after the force F has acted in the x-direction on the first flexurally elastic flank 121. The starting position and the design of framework structure 120, shown in FIG. 1A, corresponds to FIG. 1B1. The deformation shown in FIG. 1A results when framework structure 120 is fixed immovably in the area of bar 129.

The behavior is different, as FIGS. 1C4-1C11 show, when not bar 129 but the second flexurally elastic flank 122 is fixed immovably at least partially. The then occurring deformation behavior is shown in the illustrations of FIGS. 1C4-1C11, whereby each of the horizontal sequences of the illustrations of FIGS. 1C4-1C11 is based on the configuration, shown on the left in FIGS. 1B2-1B3, of framework structure 120. It can be seen that the deformation behavior of framework structures 120 changes. Depending on where the force F acts on framework structure 120, a specific deformation behavior of the particular framework structure 120 is produced.

Second Exemplary Embodiment

Figure 2A:
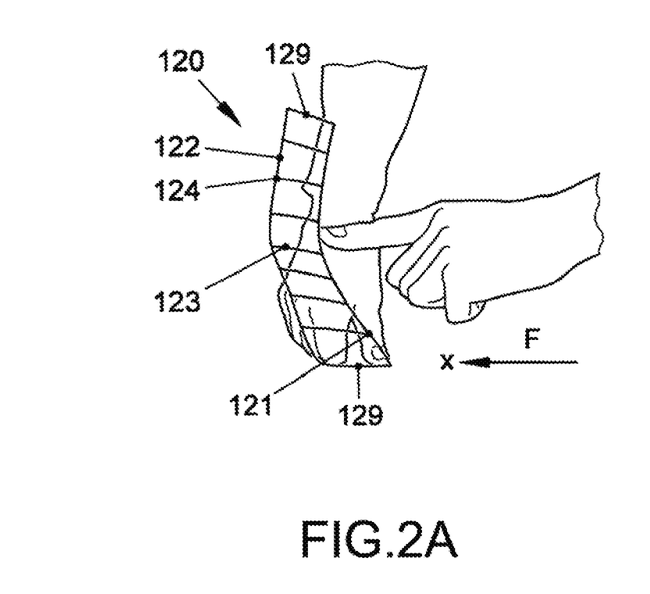
FIG. 2A shows a schematic illustration of a deformation of a rectangular autoreactive framework structure under the action of a force.
Figure 2B:
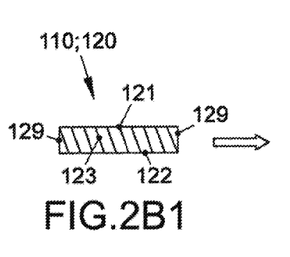
Figure 2B:
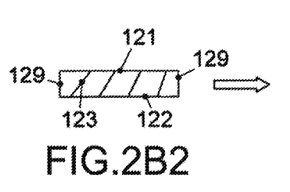
Figure 2B:
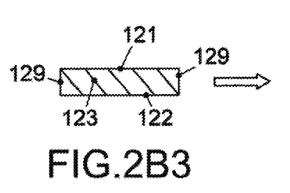
Figure 2B:
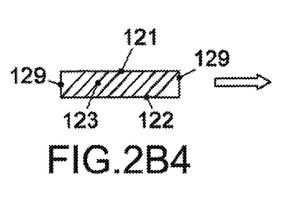
Figure 2C:
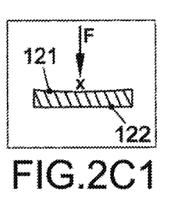
Figure 2C:
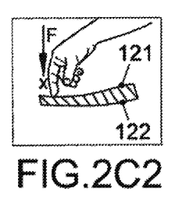
Figure 2C:
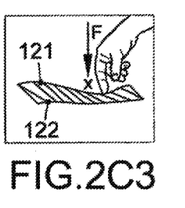
Figure 2C:
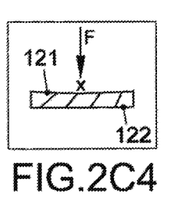
Figure 2C:
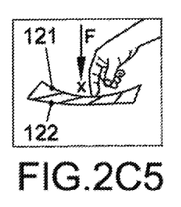
Figure 2C:
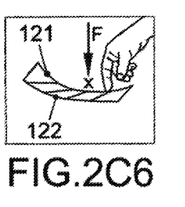
Figure 2C:
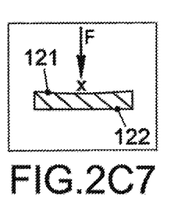
Figure 2C:
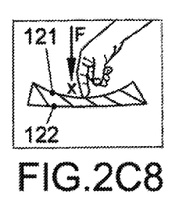
Figure 2C:
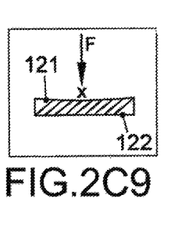
Figure 2C:
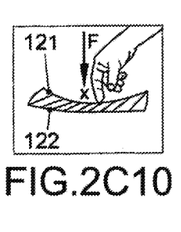
Figure 2C:
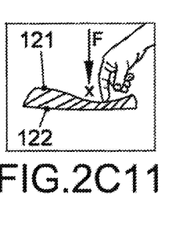

FIG. 2A shows a schematic illustration of a deformation of a rectangular, particularly square side piece framework structure 120 or a connecting framework structure 110 under the action of a force F, which is designated below only still as framework structure 110, 120. In the second embodiment, autoreactive framework structure 110, 120, seen in section, is made rectangular. Framework structure 110, 120 again has a first flexurally elastic flank 121 and a second flexurally elastic flank 122, between which transverse braces 123 are arranged elastically movable by means of elastic connecting element 124. Flexurally elastic flanks 121, 122 in the second embodiment as well can be made as planar, plate-like structures. In the rectangular embodiment, framework structure 110, 120 at both ends forms a base-forming bar 129, which is formed in each case by a transverse brace 123. The particular transverse brace 123 is arranged between the ends, diverging on both sides, of flexurally elastic flanks 121, 122.

FIGS. 2B1-2B4 show schematic sectional illustrations of different variants of the first embodiment, whereby the variants differ in the arrangement of transverse braces 123 between flexurally elastic flanks 121, 122. Depending on the number and orientation of transverse braces 123 between flexurally elastic flanks 121, 122, under the action of a force F, which acts in a point-like or planar manner on the first flexurally elastic flank 121 and exerts a force pulse on framework structure 110, 120, a deformation, different in each case, of framework structure 110, 120 is produced. The direction of the deformation is opposite to the direction of the force pulse.

The deformation of rectangular autoreactive framework structure 110, 120 can be seen in FIG. 2A and FIGS. 2C2-2C3. In FIG. 2A, the deformed framework structure is shown in section after the force F has acted in the x-direction on the first flexurally elastic flank 121. The starting position and design of framework structure 110, 120, shown in FIG. 2A, correspond to FIG. 2B1. The deformation shown in FIG. 2A results when framework structure 110, 120 is fixed immovably in the area of bottom bar 129.

The behavior is different, as FIGS. 2C4-2C11 show, when not bar 129 but the second flexurally elastic flank 122 is fixed immovably at least partially. The then occurring deformation behavior is shown in the illustrations of FIGS. 2C4-2C11, whereby each of the horizontal sequences of the illustrations is based on the configuration, shown on the left in FIGS. 2B2-2B4, of framework structure 110, 120. It can be seen that the deformation behavior of framework structures 110, 120 changes. Depending on where the force F acts on framework structure 110, 120, a specific deformation behavior of the particular framework structure 110, 120 is produced.

Further Exemplary Embodiments

Figure 3A:
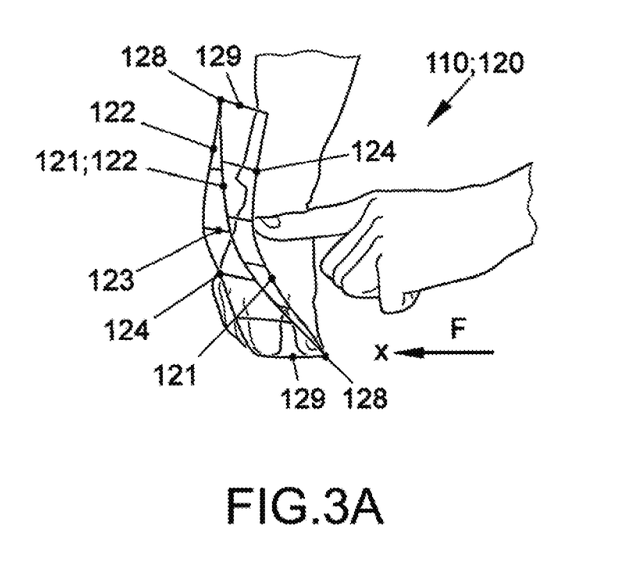
FIG. 3A shows a schematic illustration of a deformation of an autoreactive framework structure, combining various shapes, under the action of a force.

FIG. 3A shows a schematic illustration of a deformation of an autoreactive side piece framework structure 120, made of two triangular pieces, and an autoreactive connecting framework structure 110 which is made as a multi-framework structure, under the action of a force F from the x-direction. These are designated below again only as framework structures 110, 120. The multi-framework structure, made of two triangular framework structures 110, 120, is also called a double framework structure or "double fin ray." The double framework structure, seen in section, shows two triangular structures. The double framework structure to form first triangular framework structure 110, 120 has a first flexurally elastic flank 121 and a second flexurally elastic flank 122, which at the same time is the first flexurally elastic flank 121 for the next triangular framework structure 110, 120. This first flexurally elastic flank 121 lies opposite to a second flexurally elastic flank 122 of the second triangular framework structure 110, 120. Each of the two triangular framework structures 110, 120 has transverse braces 123, which again may be made as planar, plate-like structures. In this embodiment, the double framework structure at both ends forms a base, which is characterized both by a bar 129 and by a tip 128, which is formed by both framework structures 110, 120.

The deformation of an autoreactive double framework structure can be seen in FIG. 3A. In FIG. 3A, the deformed double framework structure is shown in section after the force F has acted in the x-direction on the first flexurally elastic flank 121. The deformation shown in FIG. 3A results when framework structure 110, 120 is fixed immovably in the area of the bottom base comprising tip 128 and bar 129.

FIGS. 3B1-3B5 show other special schematic sectional illustrations of further embodiments, whereby the FIGS. 3B1-3B3 embodiments differ in the orientation of transverse braces 123 between flexurally elastic flanks 121, 122. These three embodiments are not double framework structures. A deformation, different in each case, of framework structure 110, 120 is produced depending on the number and orientation of transverse braces 123 between flexurally elastic flanks 121, 122, under the action of a force F, which acts in a point-like or planar manner on the first flexurally elastic flank 121 and exerts a force pulse on framework structure 110, 120. The direction of the deformation is opposite to the direction of the force pulse.

Figures 3B, 3B, 3B, 3B, 3B, 3C, 3C, 3C, 3C, 3C, 3C, 3C, 3C, 3C, 3C:
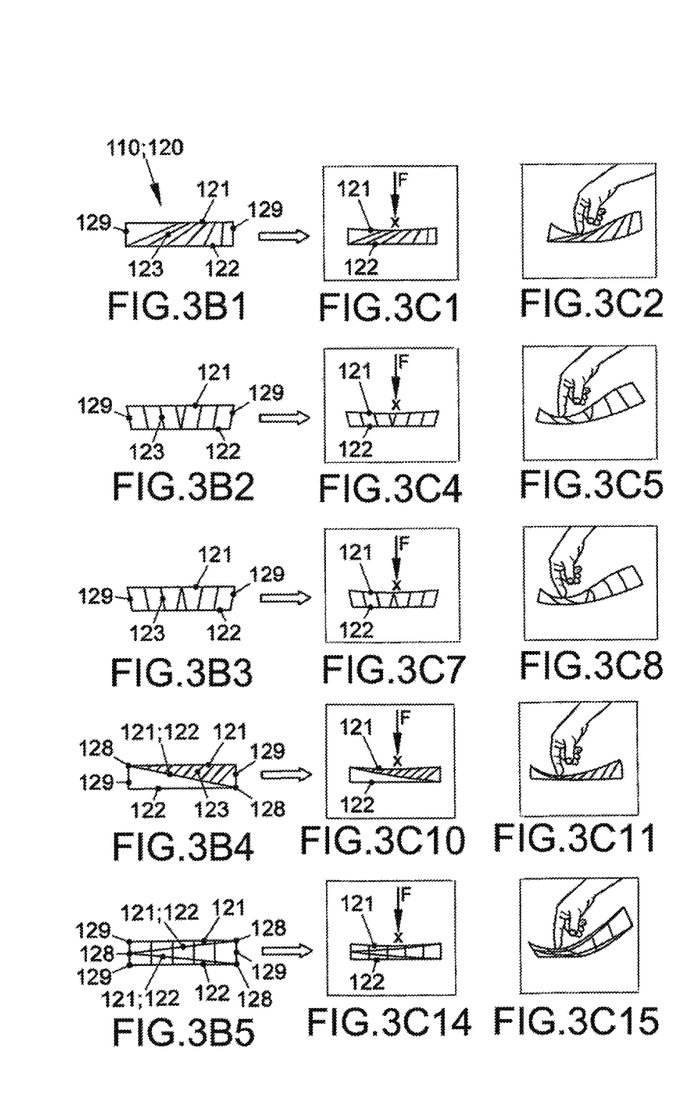
Figure 3C:
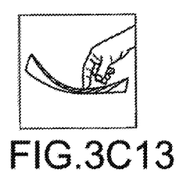
Figure 3C:
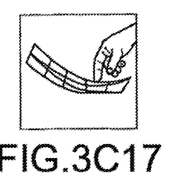
Figure 3C:
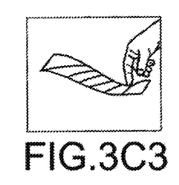
Figure 3C:
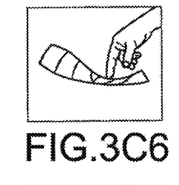
Figure 3C:
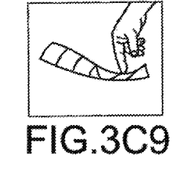
Figure 3C:
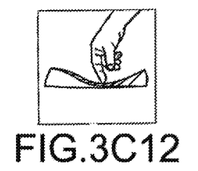
Figure 3C:
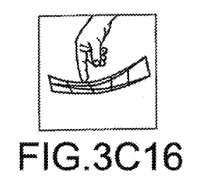

The particular feature of the embodiment of framework structure 110, 120, which is shown in FIG. 3B1, is that transverse braces 123 are arranged obliquely between flexurally elastic flanks 121, 122. A small part of framework structure 110, 120 is even formed without transverse braces 123.

The particular feature of the FIG. 3B2 embodiment of framework structure 110, 120 is that transverse braces 123 form a <V> in the middle area of framework structure 110, 120.

The special feature of the FIG. 3B3 embodiment, of framework structure 110, 120, is that transverse braces 123 form an upside down <V> in the middle area of framework structure 110, 120.

FIGS. 3B4-3B5 show further schematic sectional illustrations of other embodiments, whereby FIGS. 3B4-3B5 differ from the FIGS. 3B1-3B3 embodiments to the effect that these are multi-framework structures. These are combined together by using the same triangular shape. According to the invention, there is the possibility of combining framework structures with different shapes.

The embodiment of FIG. 3B4, is a double framework structure, as was already shown in FIG. 3A and described in relation to FIG. 3A. The difference from the embodiment according to FIG. 3A is that the arrangement of transverse braces 123 has been totally omitted in one of the two triangular framework structures 110, 120.

Finally, the embodiment of FIG. 3B5 is a triple framework structure. The triple framework structure, viewed in section, shows three triangular framework structures. To form the first triangular framework structure 110, 120, the triple framework structure has a first flexurally elastic flank 121 and a second flexurally elastic flank 122, which is opposite to a second flexurally elastic flank 122 of the second triangular framework structure 110, 120, which in turn at the same time forms the first flexurally elastic flank 121 of the third framework structure 110, 120, which is closed via a second flexurally elastic flank 122. Each of the three triangular framework structures 110, 120 has transverse braces 123, which may be made as planar, plate-like structures. At one end, the base of the triple framework structure is formed by two bars 129 and a tip 128, whereby the opposite end also forms a base comprising two tips 128 and one bar 129. It becomes clear that in this way multi-framework structures can be formed in any desired number of individual framework structures of different embodiments. Different forms of a plurality of framework structures can be combined to form a multi-framework structure.

The particular deformation behavior of framework structures 110, 120, shown from top to bottom in the sectional illustrations of FIGS. 3B1-3B5, is shown in the illustrations of FIGS. 3C1-3C17, whereby each of the horizontal sequences of the illustrations forms the basis of the configurations, shown on the left in each case in FIGS. 3B1-3B5 and previously described, of framework structure 110, 120. The deformation of the particular framework structure 110, 120, as shown in the illustrations of FIGS. 3C1-3C17, results when framework structure 110, 120 is fixed immovably at least partially with its second flexurally elastic flank 122. It can also be seen here that the deformation behavior of framework structures 110, 120 changes. Depending on where the force F acts on framework structure 110, 120, a specific deformation behavior of the particular framework structure 110, 120 is produced.

The previously described diverse design options and combinations thereof can be used to design an autoreactive side piece structure and optionally a connecting structure.

One of the possible design forms is described below with use of the sectional FIGS. 4A and 4B, in an overall view, namely, the second design form of a base structure of a seat part of a vehicle seat, in which the side piece structures are formed as autoreactive side piece framework structures 120 and the connecting structure as reversible elastic connecting body 110'. This second design form is to be understood only by way of example. The first design form (not shown in greater detail) will be dealt with in part below, in which the connecting structure is formed as a connecting framework structure 110 according to the fin ray principle. The following description relates to a seat part 100. The description can be applied analogously to side piece framework structures and connecting structures in the first or second design form of a backrest.

Figure 4A:
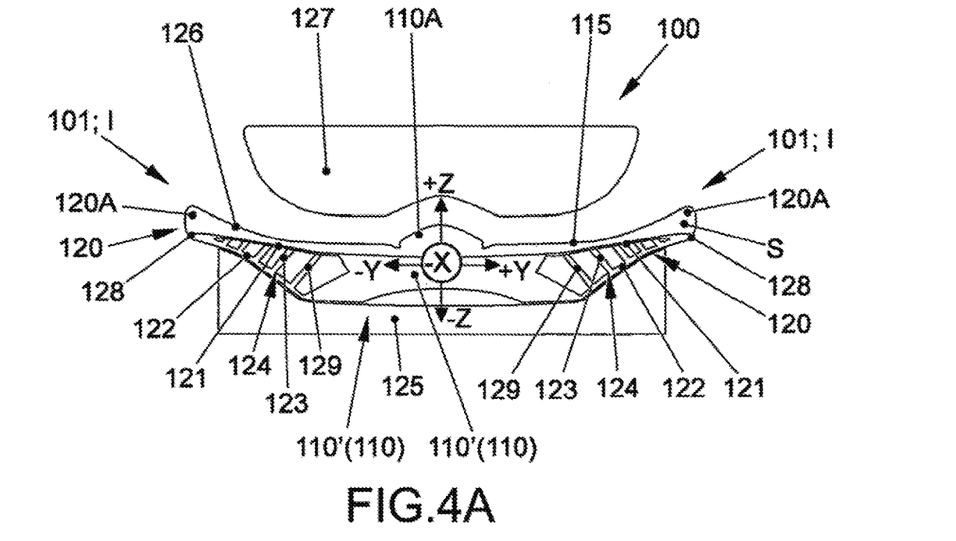
FIGS. 4A, 4B show a base structure, having autoreactive framework structures, of a seat part of a vehicle seat according to a second design form with side piece structures in a starting position (FIG. 4A) and an adjustment position (FIG. 4B).
Figure 4B:
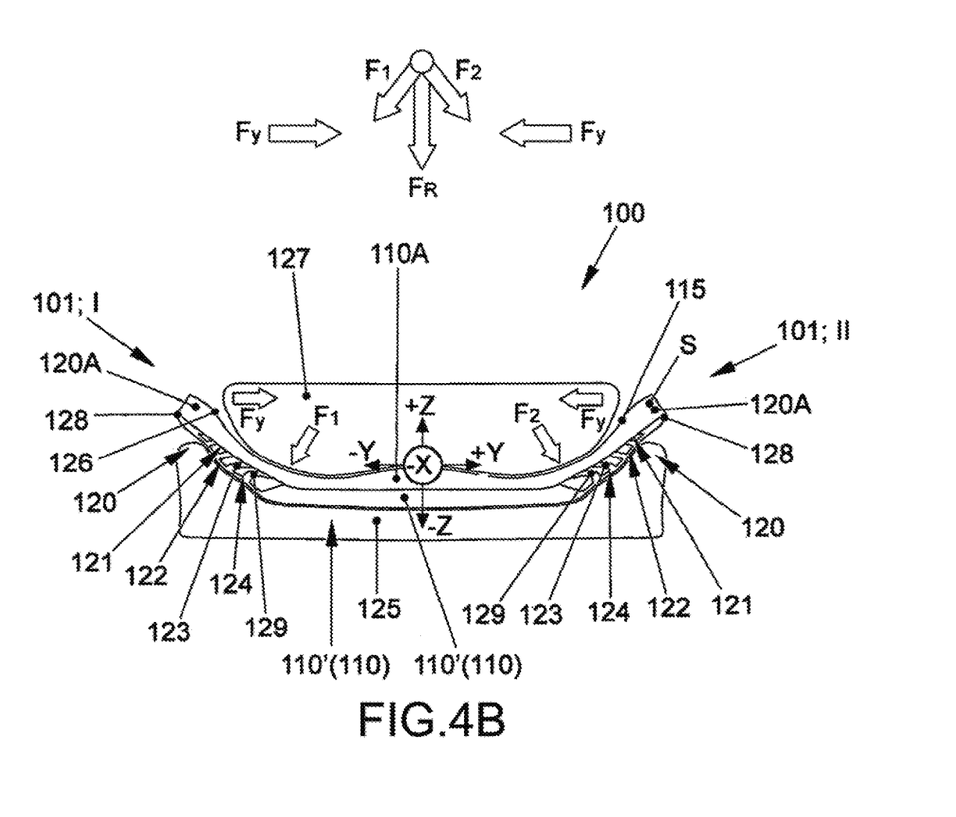

The Cartesian coordinate system is arranged in FIG. 4A, 4B in such a way that the zero point in a starting position I lies within the reversible elastically formed connecting body 110'. The viewer is looking from the front at a seat part 100, cut crosswise to the view direction, in the "−x" ("minus x") direction, therefore opposite to the conventional direction of travel.

The "y-axis" extends proceeding from the zero point from the left in the −y-direction and towards the right in the +y-direction. The "y-axis" therefore is defined as the horizontal line transverse to the x-direction. The "z-axis" extends proceeding from the zero point upwards in the +z-direction and downwards in the −z-direction. The "z-axis" therefore is defined as the vertical line transverse to the x-direction.

The y-axis in FIG. 4A is approximately parallel to a bearing surface 126, which forms a top side of the base structure of seat part 100 in the starting position I, before a seated person causes an adjustment position II of the base structure of seat part 100.

The base structure lies on a seat pan structure 125. The base structure and seat pan structure 125 are connected to one another at a suitable place, where no movement of the base structure relative to seat pan structure 125 occurs.

Preferably, the connection is made in the area of connecting structure 110, 110'. It is provided to connect the bottom side of connecting structure 110, 110' to the top side of seat pan structure 125. Connecting structure 110, 110' is then immovable relative to seat pan structure 125.

In FIG. 4A, the illustrated buttocks 127 of a person or the thighs of a person still exert no force on the base structure of seat part 100. The base structure can be padded, for example, surrounded with an upholstery foam. The base structure illustrated in FIG. 4A is not padded. No padding is provided in the embodiment described below, from which it becomes clear that padding of the base structure is not absolutely necessary.

The base structure has a left and a right side piece framework structure 120. Side piece framework structures 120 are connected to one another via connecting structure 110', 100 (110' first design form or 110 second design form).

The connecting structure in the exemplary embodiment, according to the second design form, is made as an elastic connecting body 110'.

In the exemplary embodiment, a solid elastic body is made, for example, from a seat foam.

On the side facing buttocks 127, a first thickened area 110A, cutting the buttocks axially symmetric in the x-direction, is formed in the +z-direction, which extends in the −x-direction into the plane of the page and in the +x-direction out of the plane of the page, as a result of which bearing surface 126 of the base structure is adjusted to buttocks 127. Said thickened area 110A represents an optional embodiment. Thickened area 110A can be part of connecting body 110' or connecting framework structure 110.

In the exemplary embodiment, thickened area 110A is part of a layer S, which is arranged on connecting body 110' or connecting framework structure 110, as will still be described in greater detail.

Bearing surface 126 of buttocks 127 in the starting position I of the base structure is symbolized by the line labeled with reference character 126. It is evident that side pieces 101 remain in the starting position I as long as no force acts on the base structure. A side support, i.e., a lateral support by side pieces 101, is still not necessary, because the person is still not seated on seat part 100.

Side pieces 101 for this reason are still not moved upwards in the +z-direction, as a result of which the advantage arises that when a person climbs in and is seated on the seat of a vehicle no side piece impedes the entry or sitting on the seat of the vehicle in any way.

In this regard, for example, in a possible embodiment a top side of side piece framework structures 120 together with connecting structure 110' or connecting framework structure 110 in the starting position I of the base structure forms a substantially planar surface (not shown).

In a further possible embodiment, the particular top side of side piece framework structures 120 is arranged slightly inclined relative to connecting structure 110', 110 in the starting position I of the base structure, so that even in the starting position I of the base structure a substantially slightly inclined pan contour 115 arises, as is shown in FIG. 4A.

Figure 1C:
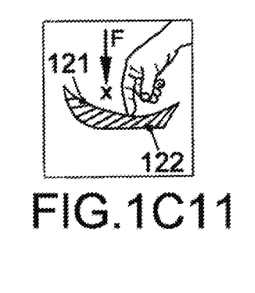

The autoreactive side piece framework structures 120 are made triangular in the exemplary embodiment. Further details on a possible embodiment of the autoreactive side piece framework structures 120 can be derived from the preceding description in connection with FIGS. 1A to 1C11.

Side piece framework structures 120 each have a first flexurally elastic flank 121 and a second flexurally elastic flank 122. Transverse braces 123 are arranged elastically movable via elastic connecting element 124 between flexurally elastic flanks 121, 122. Flexurally elastic flanks 121, 122 and transverse braces 123 may be made as planar, plate-like structures. In the triangular embodiment, framework structure 120 at one end forms a tip 128 and at the other end a bar 129 which forms a base and is also formed by a transverse brace 123, which is arranged between the ends, diverging on one side, of flexurally elastic flanks 121, 122.

The first flexurally elastic flank 121 in the starting position I in each case runs in the +/−y-direction and in the exemplary embodiment of FIG. 4A is formed only slightly inclined upwards to tip 128 compared with an imaginary horizontal surface in the area of side pieces 101. Transverse braces 123 run in the −x-direction. Second flexurally elastic flank 122 in each case runs obliquely relative to the imaginary horizontal surface and thus inclined in the −z-direction relative to first flexurally elastic flank 121. The top sides of the first flexurally elastic flank 121 (left, right) of side piece framework structures 120 form an acute angle relative to the second flexurally elastic flank 122. Second flexurally elastic flank 122 (left, right) of side piece framework structures 120 each forms the bottom side of side piece framework structures 120.

The particular top side of side piece framework structures 120 and of connecting body 110' have the already mentioned optionally arrangeable elastic layer S, which assures an increased stability of the base structure overall and provides an increase in comfort. Elastic layer S is identified with a circumferential line. It is proposed to form elastic layer S from a seat foam which increases sitting comfort.

The raised thickened area 110A, which runs in the longitudinal direction, the +/−x-direction, of seat part 100 and is directed toward the seated person in the +z-direction, and according to the exemplary embodiment is integrated in layer S, lies in the middle area of connecting body 110'.

Layer S helps to pad the brace structure of transverse braces 123 of side piece framework structures 120 or connecting structures 110', 110 with respect to a sitting person, particularly with respect to buttocks 127.

Layer S is used further to form in the area of tip 128 of side piece framework structures 120 optionally a further thickened area 120A, which is used to move side piece 101, formed as side piece framework structure 120, into its adjustment position II (FIG. 4B) laterally closer to buttocks 127 and laterally to the thighs of the sitting person.

Thickened area 120A can also be formed in another embodiment variant directly on the particular side piece framework structure 120, so that it is not integrated in layer S.

When a person sits on a seat, side piece framework structures 120 are adjusted as it were "automatically" according to the fin ray principle. The resulting force $F_R$ exerted by a person when the person sits on the base structure of seat part 100 is symbolized in FIG. 4B by buttocks 127, which press on the base structure in the −z-direction according to the associated force arrow $F_R$. The base structure assumes the adjustment position II, which will be explained in detail below. The force $F_R$ is transmitted via the buttocks and thighs to seat part 100.

The force vectors $F_R$, $F_1$, $F_2$, which indicate the force pulse for producing the compensating autoreactive deformation of side piece framework structures 120, are shown graphically in a vector plan. The resulting force $F_R$ is divided into two force vectors $F_1$ and $F_2$, which point approximately in the direction of base 129 of side piece framework structures 120.

During the action of the force $F_1$ or $F_2$ applied in a planar manner on first flexurally elastic flank 121, in each case a force pulse is exerted at one end of side piece framework structure 120 on side piece framework structure 120, which causes a deformation of side piece framework structures 120, which is opposite to the direction of the force pulse. No force is exerted on tips 128 of side piece framework structures 120 at the other end, for which reason tips 128, on a semicircular track, move in the direction opposite to the force vectors $F_1$ and $F_2$ upward in the +z-direction and inward in the +y-direction (left side piece 101) or in the −y-direction (right side piece 101).

In so doing, they press the two side piece framework structures 120 into the adjustment position II and the particular top side of side piece framework structures 120 against the seated person and produce the desired bilateral lateral support $F_y$, whereby the associated force vectors in FIG. 4B are clarified with the arrows labeled with the reference character $F_y$.

It becomes clear from the description that the so-called "fin ray" side pieces 101 assume by themselves the adjustment position II when a person sits on the vehicle seat, either when sitting on a seat part 100 or when leaning against a backrest.

Stated differently, when a person sits on the relatively planar seat contour in its starting position I, according to FIG. 4A, an automatic formation of a seat contour in adjustment position II occurs due to the self-righting side pieces 101.

In the case of seat part 100 a raising of side piece framework structures 120, forming the "fin ray" side pieces 101, occurs in the +z-direction. In the case of the backrest, an outward movement of side piece framework structures 120, forming the "fin ray" side pieces 101, occurs in the direction of travel, the +x-direction.

The raising of side pieces 101 of seat part 100 in the +z-direction or the outward movement of side pieces 101 of the backrest in the +x-direction in an advantageous manner produces a form fit between side pieces 101 and the side areas of the buttocks (hip areas) and the side areas of the thighs of the person using the vehicle seat.

Both an improvement in comfort for cornering and an increase in safety for a possible crash are achieved in an advantageous manner by the improved bilateral lateral support $F_y$ produced by the form fit.

The autoreactive deformation of side piece framework structures 120 is caused by the force pulse $F_R$, as a result of which an improved lateral support is conveyed to the seated person by the produced lateral support force $F_y$.

In particular the top area of the top side of side piece framework structure 120 of side piece 101 is pressed by thickened area 120A more greatly against the lateral areas of buttocks 127 or thighs. The result is an increase in sitting comfort. The lateral support is improved and the seat width is therefore matched "automatically" to the body contour of buttocks 127 of the sitting person with use of the fin ray principle.

Bearing surface 126, resulting in adjustment position II, of side piece framework structures 120 and connecting body 110' is again shown in FIG. 4B as a circumferential line. As can be derived further from FIG. 4B, layer S and elastic connecting body 110' are also pressed together. The sitting person sinks more or less in the −z-direction into seat part 100 depending on the elasticity (hollow body or solid body) of connecting body 110' and the stability of the adjacent side piece framework structures 120.

A contour that is changed compared with starting position I (FIG. 4A), namely, a pan contour 115 with side piece framework structures 120, inclined more greatly relative to connecting structure 110', forms in adjustment position II. In said pan contour 115, side piece framework structures 120 of side pieces 101 form a bearing surface 126, which is inclined greatly upward (+z-direction) and inward (+/−y-direction) relative to bearing surface 126, formed substantially flat or only slightly pan-shaped in the starting position I (FIG. 4A).

Thickened area 110A of layer S pressed flat elastically in the −z-direction when a person sits on it, as is made clear by FIG. 4B with the aid of the line labeled with the reference character 126, which symbolizes bearing surface 126 of buttocks 127 and/or the thighs on the top side of layer S.

To change the elasticity, connecting body 110' can also be made as an elastic hollow body from a seat foam. There is a further option to form the connecting structure as a connecting framework structure 110 according to the fin ray principle, as has already been described in the introduction in connection with the first design form.

The described solution is characterized in particular in an advantageous manner in that no actuator is needed to adjust side pieces 101, as is the case in conventional adjustable side pieces. There is an increase in comfort when a person sits on a vehicle seat due to the automatic adjustment of side pieces 101, because the lateral support is improved by the reduction of the seat width.

When used in the backrest, depending on how greatly the seated person leans against the backrest an increase in comfort is produced according to the same principle in that in the case of side pieces on a backrest as well the lateral support improves automatically due to the reduction of the backrest width. During use in a backrest, this function plays an especially advantageous role particularly in a possible crash. If due to a crash the person is pressed into seat part 100 but primarily into the backrest, the force of the crash acting on side piece framework structures 120 leads to an automatic adjustment of the side pieces in the +x-direction and inward depending on side piece 101 in the +/−y-direction to the longitudinal axis of the backrest. The seated person is held tightly in the vehicle seat as a result with use of the fin ray principle in addition to the other safety systems present in the motor vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle seat with at least one of a backrest-side base structure or a seat-part-side base structure, the at least one of a backrest-side base structure or a seat-part-side base structure having at least one movable side piece structure, the at least one side piece structure being made of at least one framework structure, the at least one framework structure comprising:

flexurally elastic flanks forming at least a portion of a first framework surface and a second framework surface; and deflectable transverse braces arranged between the flexurally elastic flanks and connected to the flexurally elastic flanks, as a result of which a force pulse acting on the transverse braces of the at least one framework structure from one direction via one of the flexurally elastic flanks causes a compensating autoreactive deformation of the at least one framework structure in an opposite direction at another point along the at least one framework structure, wherein the force pulse is a resulting force, which is exerted by a person seating himself on the vehicle seat at a point on the at least one framework structure, as a result of which the at least one framework structure at a different point moves automatically in the direction opposite to the direction of the force pulse toward the seated person, such that the seated person is laterally supported in the vehicle seat.

2. The vehicle seat according to claim 1, wherein the at least one of a backrest-side base structure or a seat-part-side base structure has a connecting structure.

3. The vehicle seat according to claim 2, wherein the connecting structure is an elastic connecting body or a hollow body or a solid body.

4. The vehicle seat according to claim 2, wherein the connecting structure is a connecting framework structure, which has the at least one framework structure therein.

5. The vehicle seat according to claim 4, wherein force vectors of the resulting force exerted by the seated person on the at least one of a backrest-side base structure or seat-part-side base structure produce an autoreactive deformation of the at least one framework structure and an autoreactive deformation of the connecting framework structure, as a result of which the at least one framework structure assumes an adjustment position, as a result of which a pan structure greatly inclined relative to the connecting structure in the side piece area is formed.

6. The vehicle seat according to claim 4, wherein the at least one framework structure of the connecting framework structure has a triangular or a rectangular shape, and wherein a plurality of framework structures of the same shape or different shapes can be assembled to form the at least one framework structure as a multi-framework structure.

7. The vehicle seat according to claim 6, wherein one of the framework structures of the multi-framework structure is devoid of any transverse braces.

8. The vehicle seat according to claim 2, wherein the at least one framework structure and the connecting structure together have an elastic layer spanning the structures.

9. The vehicle seat according to claim 8, wherein at least one of the connecting structure or the at least one framework structure have at least one thickened area, which allows an ergonomic adjustment of the connecting structure or the at least one framework structure to a buttocks area or a bottom side of a thigh or the back area of a person.

10. The vehicle seat according to claim 9, wherein the at least one thickened area is arranged in the elastic layer.

11. The vehicle seat according to claim 2, wherein force vectors of the resulting force exerted by the seated person on the at least one of a backrest-side base structure or seat-part-side base structure produce an autoreactive deformation of the at least one framework structure and a reversible elastic deformation of the connecting framework structure, in which the at least one framework structure assumes an adjustment position, as a result of which a pan structure greatly inclined relative to the connecting structure in the side piece area is formed.

12. The vehicle seat according to claim 1, wherein the at least one framework structure has a triangular or a rectangular shape, whereby a plurality of framework structures of the same shape or different shapes can be assembled to form the at least one framework structure as a multi-framework structure.

13. A framework structure, built and functioning according to the fin ray principle, at least for the formation of a side piece structure of a vehicle seat, the framework structure comprising:

flexurally elastic flanks forming at least a portion of a first framework surface and a second framework surface; and deflectable transverse braces, which lie between the flexurally elastic flanks and are connected to the flexurally elastic flanks, as a result of which a force pulse acting on the transverse braces from one direction via one of the flexurally elastic flanks causes a compensating autoreactive deformation of the framework structure in the opposite direction at another point along the at least one framework structure, wherein the force pulse is a resulting force, which is exerted by a person seating himself on the vehicle seat at a point on the framework structure, as a result of which the framework structure at a different point moves automatically in the direction opposite to the direction of the force pulse toward the seated person, such that the seated person is laterally supported in the vehicle seat.

* * * * *